United States Patent
Gotoh

(10) Patent No.: US 8,621,928 B2
(45) Date of Patent: Jan. 7, 2014

(54) SENSOR FOR DETECTING ACCELERATION AND ANGULAR VELOCITY

(71) Applicant: DENSO CORPORATION, Kariya (JP)

(72) Inventor: Keisuke Gotoh, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/772,638

(22) Filed: Feb. 21, 2013

(65) Prior Publication Data

US 2013/0152684 A1    Jun. 20, 2013

Related U.S. Application Data

(62) Division of application No. 12/781,852, filed on May 18, 2010.

(30) Foreign Application Priority Data

May 26, 2009    (JP) .................................. 2009-126595

(51) Int. Cl.
G01P 15/125    (2006.01)

(52) U.S. Cl.
USPC ..................................... 73/504.15; 73/514.32

(58) Field of Classification Search
USPC ...................................................... 73/504.15
See application file for complete search history.

(56) References Cited

U.S. PATENT DOCUMENTS

| | | | |
|---|---|---|---|
| 5,488,863 A | 2/1996 | Mochida et al. | |
| 6,415,663 B1 | 7/2002 | Mochida et al. | |
| 6,691,571 B2 * | 2/2004 | Willig et al. | 73/504.12 |
| 6,742,390 B2 * | 6/2004 | Mochida et al. | 73/504.14 |
| 2001/0015101 A1 | 8/2001 | Iwaki et al. | |
| 2003/0154788 A1 | 8/2003 | Willig et al. | |

(Continued)

FOREIGN PATENT DOCUMENTS

| | | |
|---|---|---|
| JP | 07-294262 A | 11/1995 |
| JP | 2000-74673 A | 3/2000 |
| JP | 2006-105698 A | 4/2006 |
| JP | 2008-39614 A | 2/2008 |

OTHER PUBLICATIONS

Office Action dated Mar. 20, 2013 in the co-pending U.S. Appl. No. 12/781,852.

(Continued)

*Primary Examiner* — Hezron E Williams
*Assistant Examiner* — Mark A Shabman
(74) *Attorney, Agent, or Firm* — Posz Law Group, PLC

(57) ABSTRACT

A sensor includes an acceleration detector, an angular velocity detector, a driver, and first to fourth springs. Each detector includes a pair of fixed electrodes, a pair of movable electrodes, and a pair of supporting members for supporting the movable electrodes. The driver causes the supporting members to vibrate in opposite phases in a first direction. The first spring couples the supporting members of the acceleration detector and has elasticity in a second direction perpendicular to the first direction. The second spring couples the supporting members of the acceleration detector to a base and has elasticity in both directions. The third spring couples the supporting members of the acceleration detector to the supporting members of the angular velocity detector and has elasticity in both directions. The fourth spring couples the supporting members to the movable electrodes of the angular velocity detector and has elasticity in the second direction.

11 Claims, 2 Drawing Sheets

(56) References Cited

U.S. PATENT DOCUMENTS

| | | |
|---|---|---|
| 2003/0164040 A1 | 9/2003 | Willig et al. |
| 2003/0183007 A1 | 10/2003 | Willig et al. |
| 2005/0217377 A1* | 10/2005 | Ao .................................. 73/510 |
| 2009/0071247 A1 | 3/2009 | Konaka |
| 2010/0005884 A1 | 1/2010 | Weinberg et al. |

OTHER PUBLICATIONS

Office Action mailed on Mar. 8, 2011 issued from the Japanese Patent Office in the corresponding Japanese Patent Application No. 2009-126595 (English translation attached).

Notice of Allowance dated Jul. 11, 2013 in the co-pending U.S. Appl. No. 12/781,852.

* cited by examiner

SENSOR FOR DETECTING ACCELERATION AND ANGULAR VELOCITY

CROSS REFERENCE TO RELATED APPLICATION

This application is a divisional of U.S. application Ser. No. 12/781,852 filed on May 18, 2010, which is based on and claims priority to Japanese Patent Application No. 2009-126595 filed on May 26, 2009, the disclosures of which are incorporated herein by reference.

FIELD OF THE INVENTION

The present invention relates to a sensor for detecting acceleration and angular velocity.

BACKGROUND OF THE INVENTION

For example, JP-2008-39614A discloses a sensor for detecting acceleration and angular velocity. The sensor includes a vibrator configured to be displaced in both a drive direction and a detection direction perpendicular to the drive direction, a driver for causing the vibrator to vibrate in the drive direction, and detection electrodes for detecting a displacement of the vibrator in the detection direction based on a change in its capacitance.

The sensor disclosed in JP-2008-39614A detects acceleration and angular velocity by detecting the capacitance change of the detection electrodes. That is, both acceleration and angular velocity are detected based on the capacitance change of the detection electrodes. Therefore, it is difficult to determine a structural resonance, which is in proportion to the square root of a spring constant and in inverse proportion to the square root of the mass, suitable for both acceleration and angular velocity detection.

The detection electrodes are arranged in parallel to the drive direction and coupled together by a detection spring having elasticity in the detection direction. Further, the detection electrodes are coupled together in the drive direction by a coupling link spring.

JP-2008-39614A describes as follows: "When acceleration is applied, the detection spring is displaced in the same phase in the detection direction. Therefore, resonance frequency (structural resonance) at the time of detection of acceleration depends on the detection spring. In contrast, when angular velocity is applied, the detection spring is displaced in opposite phases in the detection direction. Therefore, the resonance frequency at the time of detection of angular velocity depends on both the detection spring but also the coupling link spring. For this reason, the resonance frequency at the time of detection of acceleration and the resonance frequency at the time of detection of angular velocity can be separated from each other by adjusting a spring constant of the coupling link spring".

However, unless the detection electrodes are ideally displaced in the same phase in the detection direction, the resonance frequency at the time of detection of acceleration may depend on not only the detection spring but also the coupling link spring. In practice, the detection electrodes cannot be ideally displaced in the same phase in the detection direction due to factors such as manufacturing variations. If the detection electrodes are not ideally displaced in the same phase in the detection direction, the detection electrodes are obliquely positioned with respect to each other. As a result, since biasing force of the coupling link spring acts on the detection electrodes in the detection direction, the coupling link spring contributes to the structural resonance at the time of detection of acceleration. Therefore, the structural resonance at the time of detection of acceleration substantially depends on both the detection spring and the coupling link spring.

As described above, according to the sensor disclosed in JP-2008-39614A, each of the resonance frequency at the time of detection of acceleration and the resonance frequency at the time of detection of angular velocity depends on both the detection spring and the coupling link spring. Therefore, it is difficult to determine the structural resonance suitable for both acceleration and angular velocity detection.

For example, when the structural resonance (i.e., spring constant) is reduced, it becomes likely that the detection electrodes are displaced by an inertial force. As a result, the amount of the capacitance change of the detection electrodes due to the inertial force is increased so that a sensitivity characteristic of the acceleration sensor can be improved. However, in this case, since it becomes likely that the detection electrodes are displaced by an external force, an impact resistance of the angular velocity sensor may be reduced.

Conversely, when the structural resonance (i.e., the spring constant) is increased, it becomes less likely that the detection electrodes are displaced by the inertial force. As a result, it becomes less likely that the detection electrodes are displaced by the external force so that the impact resistance of the angular velocity sensor can be improved. However, in this case, since it becomes less likely that the detection electrodes are displaced by the inertial force, the sensitivity characteristic of the acceleration sensor may be reduced.

SUMMARY OF THE INVENTION

In view of the above, it is an object of the present invention to provide a sensor having an acceleration detector and an angular velocity detector, and configured to prevent a reduction in a sensitivity characteristic of the acceleration detector and a reduction in an impact resistance of the angular velocity detector.

According to an aspect of a present invention, a sensor for detecting acceleration and angular velocity includes an acceleration detector, an angular velocity detector, a driver, a first spring, a second spring, a third spring, and a fourth spring. The acceleration detector includes a pair of first fixed electrodes, a pair of first movable electrodes, a pair of weights, and a pair of first supporting members. The pair of first supporting members supports the pair of first movable electrodes and is joined to the pair of weights. The angular velocity detector includes a pair of second fixed electrodes, a pair of second movable electrodes, and a pair of second supporting members. The pair of second supporting members supports the pair of second movable electrodes. The driver causes the pair of first supporting members to vibrate in opposite phases in a first direction and causes the pair of second supporting members to vibrate in opposite phases in the first direction. The first spring couples the pair of first supporting members together and has elasticity in a second direction perpendicular to the first direction. The second spring couples the pair of first supporting members to a base and has elasticity in both the first direction and the second direction. The third spring couples the pair of first supporting members to the pair of second supporting members and has elasticity in both the first direction and the second direction. The fourth spring couples the pair of second supporting members to the pair of second movable electrodes and has elasticity in the second direction.

According to another aspect of a present invention, a sensor for detecting acceleration and angular velocity includes an acceleration detector, an angular velocity detector, a driver, a first spring, a second spring, a third spring, a fourth spring, and a fifth spring. The acceleration detector includes a pair of first fixed electrodes, a pair of first movable electrodes, a pair of weights, and a pair of first supporting members. The pair of first supporting members supports the pair of first movable electrodes and is joined to the pair of weights. The angular velocity detector includes a pair of second fixed electrodes, a pair of second movable electrodes, and a pair of second supporting members. The pair of second supporting members supports the pair of second movable electrodes. The driver causes the pair of first supporting members to vibrate in opposite phases in a first direction and causes the pair of second supporting members to vibrate in opposite phases in the first direction. The first spring couples the pair of first supporting members together and has elasticity in the first direction. The second spring couples the pair of first supporting members to the base and has elasticity in both the first direction and a second direction perpendicular to the first direction. The third spring couples the pair of first supporting members to the pair of second supporting members and has elasticity in both the first direction and the second direction. The fourth spring couples the pair of second supporting members to the pair of second movable electrodes and has elasticity in the second direction. The fifth spring couples the pair of second supporting members together and has elasticity in the first direction.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENT

A sensor 100 according to an embodiment of the present invention is described below with reference to FIG. 1. The sensor 100 is configured to detect acceleration and angular velocity.

Figure 1:
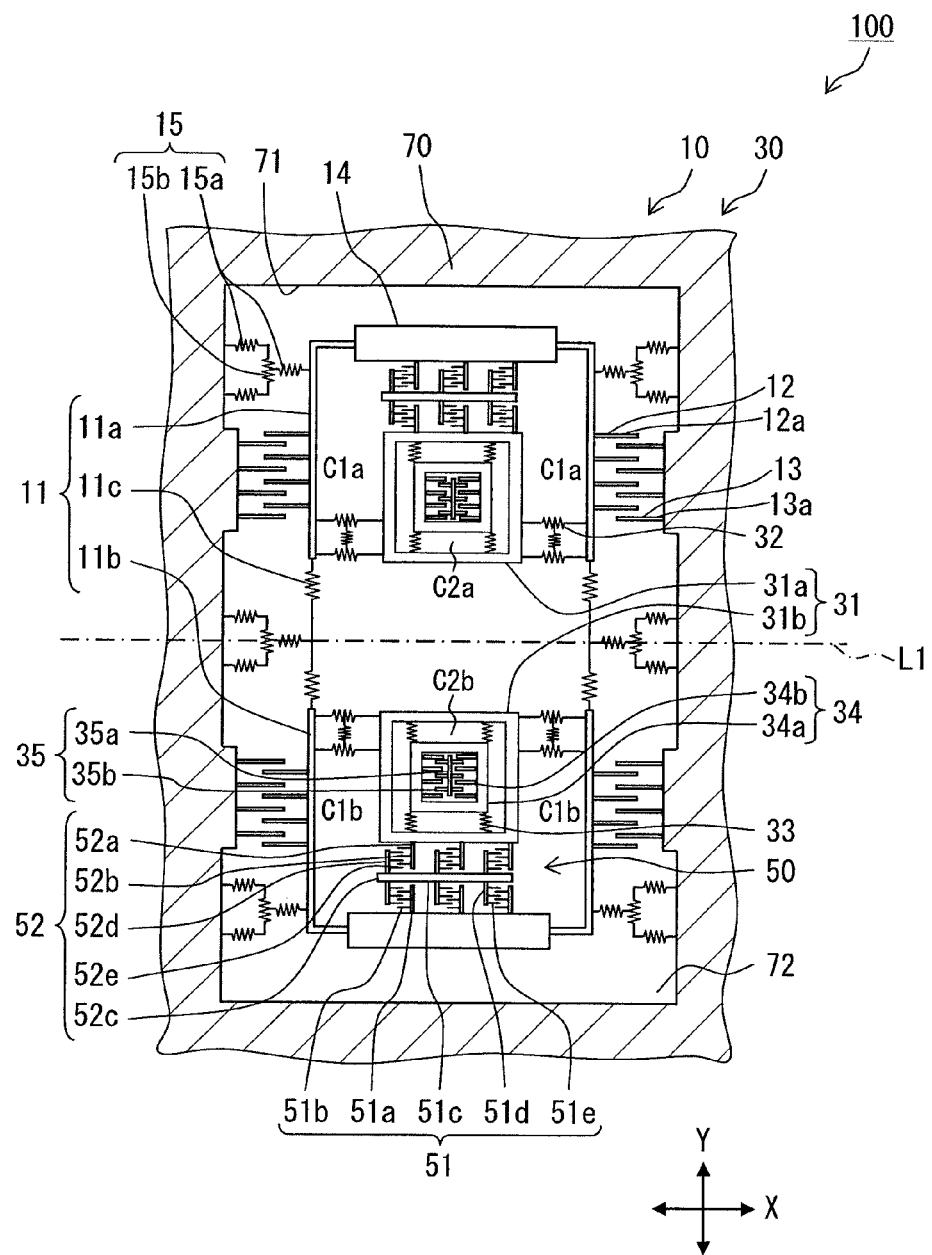
FIG. 1 is a diagram illustrating a plan view of a sensor according to an embodiment of the present invention.

As shown in FIG. 1, the sensor 100 includes an acceleration detector 10 for detecting acceleration, an angular velocity detector 30 for detecting angular velocity, and a driver 50 for causing drive frames 11, 31 to vibrate in a X direction as a first direction. The sensor 100 has symmetry with respect to a line L1 indicated by a dashed line in FIG. 1. The line L1 is parallel to the X-direction. The sensor 100 is a microelectromechanical systems (MEMS) device forming by micromachining a semiconductor substrate such as a SOI substrate by a known exposure technique. That is, the acceleration detector 10, the angular velocity detector 30, and the driver 50 are integrated on a base 70 equivalent to the semiconductor substrate.

The acceleration detector 10 includes a first drive frame 11, a first movable electrode 12, a first fixed electrode 13, and a weight 14. The first movable electrode 12 is joined to the first drive frame 11. The first fixed electrode 13 is joined to a wall 71 of the base 70 and located facing the first movable electrode 12 in a Y-direction as a second direction perpendicular to the first direction. The weight 14 is joined to the first drive frame 11.

The first drive frame 11 includes a first pair of supporting members 11a, 11b and a first spring 11c. Each of the supporting members 11a, 11b has one X-direction portion parallel to the X-direction and two Y-direction portions parallel to the Y-direction. The X-direction portion and the Y-direction portions are joined together so that each of the supporting members 11a, 11b can have a rectangular C-shape in cross-section taken along a XY-plane defined by the X-direction and the Y-direction. The first spring 11c couples ends of the supporting member 11a to ends of the supporting member 11b. The first spring 11c can be displaced in the Y-direction. Each of the supporting members 11a, 11b has rigidity.

The weight 14 and an extension 51a of a first vibrating portion 51 are joined to the X-direction portion. The first movable electrode 12 is joined to each of the Y-direction portions. A second spring 15 is joined to the wall 71 of the base 70 and allows the drive frame 11 to be displaced in the X-direction and in the Y-direction. Accordingly, the first movable electrode 12 can be displaced with respect to the wall 71 (i.e., the first fixed electrode 13) of the base 70 in the X-direction and in the Y-direction. It is noted that the second spring 15 includes a X-direction spring 15a and a Y-direction spring 15b joined to the X-direction spring 15a. The X-direction spring 15a can be displaced in the X-direction, and the Y-direction spring 15b can be displaced in the Y-direction. That is, the X-direction spring 15a has elasticity in the X-direction, and the Y-direction spring 15b has elasticity in the Y-direction. In the example shown in FIG. 1, six second springs 15 are joined to the wall 71 to couple the first drive frame 11 to the wall 71.

As shown in FIG. 1, the first movable electrode 12 has a first tooth portion 12a extending in the X-direction from the first pair of supporting members 11a, 11b toward the first fixed electrode 13. The first fixed electrode 13 has a second tooth portion 13a extending in the X-direction from the wall 71 toward the first movable electrode 12. The first tooth portion 12a and the second tooth portion 13a are located facing each other in the Y-direction to form a first pair of capacitors C1a, C1b. The first pair of capacitors C1a, C1b has symmetry with respect to the line L1.

Since the first movable electrode 12 is coupled to each of the first spring 11c and the second spring 15, the first movable electrode 12 can be displaced with respect to the wall 71 in the X-direction and in the Y-direction. A displacement of the first movable electrode 12 in the X-direction depends on the second spring 15, and the displacement of the first movable electrode 12 in the Y-direction depends on both the first spring 11c and the second spring 15. In contrast, since the first fixed electrode 13 is fixed to the wall 71, the first fixed electrode 13 cannot be displaced with respect to the wall 71. Therefore, a capacitance of the capacitors C1a, C1b change depending on the displacement of the first movable electrode 12.

As described above, the displacement of the first movable electrode 12 in the X-direction depends on the second spring 15. Therefore, the capacitance change of the capacitors C1a, C1b due to a change in a facing area (i.e., an overlapping area) between the first movable electrode 12 and the first fixed electrode 13 depends on the second spring 15. In contrast, the displacement of the first movable electrode 12 in the Y-direction depends on both the first spring 11c and the second spring 15. Therefore, the capacitance change of the capacitors C1a, C1b due to a change in a distance between the first movable electrode 12 and the first fixed electrode 13 depends on both the first spring 11c and the second spring 15.

It is noted that each clearance between the first tooth portion 12a and the wall 71 and between the second tooth portion 13a and the first pair of supporting members 11a, 11b is larger than the maximum amplitude of vibration of the first drive frame 11 (i.e., the first movable electrode 12). Thus, when the first movable electrode 12 vibrates in the X-direction, the first tooth portion 12a does not hit against the wall 71, and the second tooth portion 13a does not hit against the first pair of supporting members 11a, 11b.

The distance between the first tooth portion 12a and the second tooth portion 13a is greater than the maximum displacement of the first drive frame 11 (i.e., the first movable electrode 12) in the Y-direction. Thus, when the first movable electrode 12 is displaced in the Y-direction, the first tooth portion 12a does not hit against the second tooth portion 13a.

Further, a facing length (i.e., overlapping length) between the first tooth portion 12a and the second tooth portion 13a in the X-direction is greater than the maximum amplitude of vibration of the first drive frame 11 (i.e., the first movable electrode 12). Thus, when the first movable electrode 12 vibrates in the X-direction, the facing area between the first movable electrode 12 and the first fixed electrode 13 becomes greater than zero so that a considerable reduction in the capacitance of the capacitors C1a, C1b can be prevented.

The angular velocity detector 30 is located in a region surrounded by the first drive frame 11. The angular velocity detector 30 includes a second drive frame 31, a third spring 32, a fourth spring 33, a second movable electrode 34, and a second fixed electrode 35. The second drive frame 31 is coupled to the first drive frame 11 by the third spring 32. The third spring 32 can be displaced in the X-direction and in the Y-direction. The second movable electrode 34 is coupled to the second drive frame 31 by the fourth spring 33. The fourth spring 33 can be displaced in the Y-direction. The second fixed electrode 35 is joined to a bottom 72 of the base 70 and located facing the second movable electrode 34 in the Y-direction.

The second drive frame 31 includes a second pair of supporting members 31a, 31b. Each of the supporting members 31a, 31b has two X-direction portions parallel to the X-direction and two Y-direction portions parallel to the Y-direction. The X-direction portions and the Y-direction portions of the supporting members 31a, 31b are joined together so that each of the supporting members 31a, 31b can have a rectangular ring shape in cross-section taken along the XY-plane. Each of the supporting members 31a, 31b has rigidity. The third spring 32 is joined to outer surfaces of the Y-direction portions of the supporting members 31a, 31b. The fourth spring 33 is joined to inner surfaces of the X-direction portions of the supporting members 31a, 31b. Thus, the second pair of supporting members 31a, 31b can vibrate in a coupled manner in the X-direction, and the second movable electrode 34 can be displaced in the Y-direction.

The second movable electrode 34 has a detection frame 34a and a third tooth portion 34b. The detection frame 34a has two X-direction portions parallel to the X-direction and two Y-direction portions parallel to the Y-direction. The X-direction portions and the Y-direction portions of the second movable electrode 34 are joined together so that the second movable electrode 34 can have a rectangular ring shape in cross-section taken along the XY-plane. As shown in FIG. 1, the second movable electrode 34 has symmetry with respect to the line L1. The third tooth portion 34b is joined to an inner surface of the Y-direction portion of the detection frame 34a and extends in the X-direction toward the center of the detection frame 34a.

The second fixed electrode 35 has an extension 35a and a fourth tooth portion 35b. The extension 35a extends in the Y-direction. The fourth tooth portion 35b is joined to the extension 35a and extends in the X-direction. As shown in FIG. 1, the second fixed electrode 35 has symmetry with respect to the line L1. The third tooth portion 34b of the second movable electrode 34 and the fourth tooth portion 35b of the second fixed electrode 35 are located facing each other in the Y-direction to form a second pair of capacitors C2a, C2b. The second pair of capacitors C2a, C2b has symmetry with respect to the line L1.

The second movable electrode 34 is joined to the wall 71 of the base 70 through the fourth spring 33, the second drive frame 31, the third spring 32, the first drive frame 11, and the second spring 15. Therefore, the second movable electrode 34 can be displaced with respect to the bottom 72 in the X-direction and in the Y-direction. A displacement of the second movable electrode 34 in the X-direction depends on both the second spring 15 and the third spring 32, and the displacement of the second movable electrode 34 in the Y-direction depends on both the third spring 32 and the fourth spring 33. In contrast, since the second fixed electrode 35 is fixed to the bottom 72, the second fixed electrode 35 cannot be displaced with respect to the bottom 72. Therefore, a capacitance of the capacitors C2a, C2b changes depending on the displacement of the second movable electrode 34.

As described above, the displacement of the second movable electrode 34 in the X-direction depends on both the second spring 15 and the third spring 32. Therefore, the capacitance change of the capacitors C2a, C2b due to a change in a facing area (i.e., an overlapping area) between the second movable electrode 34 and the second fixed electrode 35 depends on both the second spring 15 and the third spring 32. In contrast, the displacement of the second movable electrode 34 in the Y-direction depends on both the third spring 32 and the fourth spring 33. Therefore, the capacitance change of the capacitors C2a, C2b due to a change in a distance between the second movable electrode 34 and the second fixed electrode 35 depends on both the third spring 32 and the fourth spring 33. Specifically, the displacement of the second movable electrode 34 in the Y-direction depends on also the second spring 15. However, contribution of the second spring 15 to the displacement of the second movable electrode 34 in the Y-direction is small enough to be negligible. Therefore, it can be considered that the displacement of the second movable electrode 34 in the Y-direction depends on both the third spring 32 and the fourth spring 33. It is noted that the second spring 15 mainly distributes to the displacement of the first drive frame 11 in the Y-direction.

It is noted that each clearance between the third tooth portion 34b and the extension 35a and between the fourth tooth portion 35b and the detection frame 34a is larger than the maximum amplitude of vibration of the second drive frame 31 (i.e., the second movable electrode 34). Thus, when the second movable electrode 34 vibrates in the X-direction, the third tooth portion 34b does not hit against the extension 35a, and the fourth tooth portion 35b does not hit against the detection frame 34a.

A distance between the third tooth portion 34b and the fourth tooth portion 35b is greater than the maximum displacement of the second drive frame 31 (i.e., the second movable electrode 34) in the Y-direction. Thus, when the second drive frame 31 (i.e., the second movable electrode 34) is displaced in the Y-direction, the third tooth portion 34b does not hit against the fourth tooth portion 35b.

Further, a facing length (i.e., overlapping length) between the third tooth portion 34b and the fourth tooth portion 35b in the X-direction is greater than the maximum amplitude of vibration of the second drive frame 31 (i.e., the second movable electrode 34). Thus, when the second movable electrode 34 vibrates in the X-direction, the facing area between the second movable electrode 34 and the second fixed electrode 35 becomes greater than zero so that a considerable reduction in the capacitance of the capacitors C2a, C2b can be prevented.

The driver 50 causes the first and second drive frames 11, 31 to vibrate in the X-direction. The driver 50 includes a first driver 51 and a second driver 52. The first driver 51 causes the first pair of supporting members 11a, 11b to vibrate. The second driver 52 causes the second pair of supporting members 31a, 31b to vibrate.

As shown in FIG. 1, the first driver 51 has symmetry with respect to the line L1. The first driver 51 includes an extension 51a, a fifth tooth portion 51b, a beam 51c, an extension 51d, and a sixth tooth portion 51e. The extension 51a is joined to the weight 14 and extends in the Y-direction toward the second drive frame 31. The fifth tooth portion 51b is joined to the extension 51a and extends in the X-direction toward the left of FIG. 1. The beam 51c is joined to the bottom 72 of the base 70 and extends in the X-direction. The extension 51d is joined to the beam 51c and extends in the Y-direction toward the wall 71. The sixth tooth portion 51e is joined to the extension 51d and extends in the X-direction toward the right of FIG. 1. Thus, the fifth tooth portion 51b and the sixth tooth portion 51e form comb electrodes.

As shown in FIG. 1, the second driver 52 has symmetry with respect to the line L1. The second driver 52 includes an extension 52a, a seventh tooth portion 52b, a beam 52c, an extension 52d, and an eighth tooth portion 52e. The extension 52a is joined to the X-direction portion of the second drive frame 31 and extends in the Y-direction toward the weight 14. The seventh tooth portion 52b is joined to the extension 52a and extends in the X-direction toward the left of FIG. 1. The beam 52c is joined to the bottom 72 of the base 70 and extends in the X-direction. The extension 52d is joined to the beam 52c and extends in the Y-direction toward the second drive frame 31. The eighth tooth portion 52e is joined to the extension 52d and extends in the X-direction toward the right of FIG. 1. Thus, the seventh tooth portion 52b and the eighth tooth portion 52e form comb electrodes. It is noted that the beam 51c is the same as the beam 52c.

Assuming that a first drive voltage with a predetermined first frequency is applied to the first driver 51, a polarity of electrostatic force produced between the tooth portions 51b, 51e changes at the first frequency. Due to the electrostatic force between the tooth portions 51b, 51e, the weight 14 joined to the extension 51a vibrates in the X-direction at the first frequency. Accordingly, the first drive frame 11 to which the weight 14 is joined vibrates in the X-direction at the first frequency.

Assuming that a second drive voltage with a predetermined second frequency is applied to the second driver 52, a polarity of electrostatic force produced between the tooth portions 52b, 52e changes at the second frequency. Due to the electrostatic force between the tooth portions 52b, 52e, the second drive frame 31 to which the extension 52a is joined vibrates in the X-direction at the second frequency. Accordingly, the second movable electrode 34 that is joined to the second drive frame 31 through the fourth spring 33 vibrates in the X-direction at the second frequency.

When the weight 14 vibrates in the X-direction, the vibration of the weight 14 is transmitted to the second drive frame 31 through the first drive frame 11 and the third spring 32. Thus, each of the supporting members 31a, 31b vibrates in the X-direction. When the weight 14 is displaced in a first direction (i.e., left or right in FIG. 1) of the X-direction, the second drive frame 31 is displaced in the first direction by following the displacement of the weight 14. Therefore, when drive voltages with opposite polarities are respectively applied to the first drivers 51, the weights 14 vibrate in opposite phases in the X-direction so that the supporting members 31a, 31b can vibrate in opposite phases in the X-direction. In this case, the supporting members 11a, 11b also vibrate in opposite phases in the X-direction. In the embodiment, the drive voltages with opposite polarities are respectively applied to the first drivers 51. In such an approach, the supporting members 11a, 11b vibrate in opposite phases in the X-direction so that the supporting members 31a, 31b can vibrate in opposite phases in the X-direction.

The second movable electrode 34 forming the capacitor C2a and the second movable electrode 34 forming the capacitor C2b vibrate in opposite phases in the X-direction. Therefore, a capacitance change of the capacitor C2a due to the vibration caused by the second driver 52 becomes equal to a capacitance change of the capacitor C2b due to the vibration caused by the second driver 52. In other words, the capacitance change of the capacitor C2a due to the displacement of the second movable electrode 34 in the X-direction becomes equal to the capacitance change of the capacitor C2b due to the displacement of the second movable electrode 34 in the X-direction. Therefore, an output voltage of the capacitor C2a can be compared with the an output voltage of the capacitor C2b without taking into consideration the effect of the second driver 52. In other words, there is no need to take into consider the capacitance change of the capacitors C2a, C2b due to the change in the facing area between the second movable electrode 34 and the second fixed electrode 35.

The sensor 100 detects an acceleration based on the following acceleration detection principle. When an acceleration is applied to the sensor 100 in the Y-direction under a condition that the supporting members 31a, 31b are caused to vibrate in opposite phases in the X-direction by the first driver 51, the first movable electrode 12 forming the capacitor C1a and the first movable electrode 12 forming the capacitor C1b vibrate, along with the first movable electrode 12, in the same phase in the Y-direction due to inertial force induced by the acceleration. As a result, the distance between the first movable electrode 12 and the first fixed electrode 13 changes so that the capacitance of the capacitors C1a, C1b can change. Since the amount of the capacitance change of the capacitors C1a, C1b is in proportion to the acceleration applied to the sensor 100, the acceleration can be detected based on the amount of the capacitance change of the capacitors C1a, C1b.

The sensor 100 detects an angular velocity based on the following angular velocity principle. When an acceleration is applied to the sensor 100 in a Z-direction under a condition that the supporting members 31a, 31b are caused to vibrate in opposite phases in the X-direction by the first and second drivers 51, 52, Coriolis force in the Y-direction acts on the supporting members 31a, 31b, and the second movable electrode 34 that is connected through the fourth spring 33 to the supporting members 31a, 31b. The Coriolis force is in proportion to the vibration speed and the angular velocity. As described above, since the second movable electrode 34 forming the capacitor C2a and the second movable electrode 34 forming the capacitor C2b vibrate in opposite phases in the X-direction, the Coriolis force acting on the second movable electrode 34 forming the capacitor C2a is opposite to the Coriolis force acting on the second movable electrode 34 forming the capacitor C2b in the Y-direction. Accordingly, the second movable electrode 34 forming the capacitor C2a and the second movable electrode 34 forming the capacitor C2b are displaced in opposite directions along the Y-direction. As a result, the distance between the second movable electrode 34 and the second fixed electrode 35 changes so that the capacitance of the capacitors C2a, C2b can change. Since the amount of the capacitance change of the capacitors C2a, C2b is in proportion to the angular velocity applied to the sensor 100, the angular velocity can be detected based on the amount of the capacitance change of the capacitors C2a, C2b.

As described above, according to the embodiment of the present invention, the first movable electrode 12 is supported by the first pair of the supporting members 11a, 11b. The supporting members 11a, 11b are coupled together by the first spring 11c having elasticity in the Y-direction. Each of the supporting members 11a, 11b is coupled to the wall 71 of the base 70 by the second spring 15 having elasticity in both the X-direction and the Y-direction. Thus, a structural resonance of the acceleration detector 10 depends on the first spring 11c and the second spring 15, each of which has elasticity in the Y-direction as a detection direction.

In contrast, the second pair of supporting members 31a, 31b are coupled to the first pair of the supporting members 11a, 11b by the third spring 32 having elasticity in both the X-direction and the Y-direction. Further, the second pair of the supporting members 31a, 31b is coupled to the second movable electrode 34 by the fourth spring 33 having elasticity in the Y-direction. Thus, a structural resonance of the angular velocity detector 30 depends on the third spring 32 and the fourth spring 33, each of which has elasticity in the Y-direction.

In summary, the structural resonance of the angular velocity detector 30 and the structural resonance of the angular velocity detector 30 are separated from each other. Therefore, the structural resonance of the angular velocity detector 30 and the structural resonance of the angular velocity detector 30 can be separately determined by adjusting spring constants of the first spring 11c, the second spring 15, the third spring 32, and the fourth spring 33. For example, increasing the spring constants of the first spring 11c and the spring 15b of the second spring 15 can prevent a reduction in sensitivity characteristics of the acceleration detector 10, and decreasing the spring constants of the third spring 32 and the fourth spring 33 can prevent a reduction in impact resistance of the angular velocity detector 30. Therefore, the sensor 100 can be configured in such a manner that the acceleration detector 10 has a suitable sensitivity characteristics and that the angular velocity detector 30 has a suitable impact resistance.

Specifically, it is noted that the structural resonance of the angular velocity detector 30 depends on not only the spring constants of the third and fourth springs 32, 33 but also the spring constant of the second spring 15. However, the structural resonance of the angular velocity detector 30 and the structural resonance of the angular velocity detector 30 can be separated from each other by adjusting the spring constants of the third and fourth springs 32, 33. Further, as mentioned previously, since the second spring 15 mainly distributes to the displacement of the first drive frame 11 in the Y-direction, the contribution of the second spring 15 to the displacement of the second movable electrode 34 in the Y-direction is small enough to be negligible.

According to the embodiment, the second movable electrode 34 of the angular velocity detector 30 is joined to the wall 71 of the base 70 through the fourth spring 33, the second drive frame 31, the third spring 32, the first drive frame 11, and the second spring 15. Thus, external stress applied to the base 70 is damped by the fourth spring 33, the second drive frame 31, the third spring 32, the first drive frame 11, and the second spring 15 before reaching the second movable electrode 34. For this reason, in particular, regarding angular velocity, the reduction in the impact resistance can be prevented.

According to the embodiment, the first movable electrode 12 has the first tooth portion 12a, and the first fixed electrode 13 has the second tooth portion 13a forming comb-electrodes with the first tooth portion 12a. Thus, the facing area between the first movable electrode 12 and the first fixed electrode 13 can be increased compared to a case where the first movable electrode 12 and the first fixed electrode 13 are plate electrodes.

According to the embodiment, the second movable electrode 34 has the third tooth portion 34b, and the second fixed electrode 35 has the fourth tooth portion 35b forming comb-electrodes with the third tooth portion 34b. Thus, the facing area between the second movable electrode 34 and the second fixed electrode 35 can be increased compared to a case where the second movable electrode 34 and the second fixed electrode 35 are plate electrodes.

(Modification)

The embodiment described above can be modified in various ways, for example, as follows.

Figure 2:
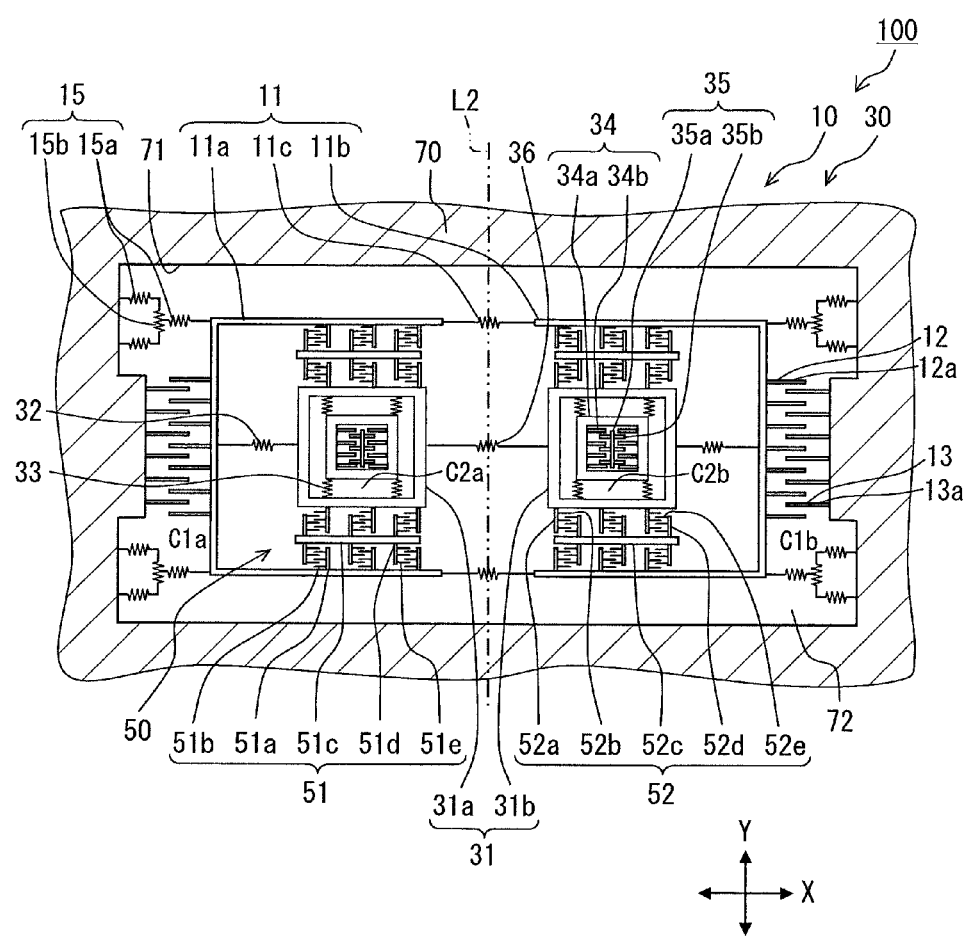
FIG. 2 is a diagram illustrating a plan view of a sensor according to a modification of the embodiment.

In the embodiment, the second pair of supporting members 31a, 31b are arranged symmetrically with respect to the line L1 in the Y-direction. Alternatively, as shown in FIG. 2, the second pair of supporting members 31a, 31b can be arranged symmetrically with respect to a line L2 in the X-direction. The line L2 is parallel to the Y-direction. That is, whereas the sensor 100 according to the embodiment has symmetry with respect to the line L1, the sensor 100 according to the modification shown in FIG. 2 has symmetry with respect to the line L2. In the modification shown in FIG. 2, the second pair of supporting members 31a, 31b are coupled together by a fifth spring 36 having elasticity in the X-direction and thus can vibrate in a coupled manner in the X-direction.

In the embodiment, the first movable electrode 12 has the first tooth portion 12a. That is, the first movable electrode 12 has a comb-shape. Alternatively, the first movable electrode 12 can have a shape other than a comb-shape. For example, the first movable electrode 12 can have a plate-shape.

In the embodiment, the first fixed electrode 13 has the second tooth portion 13a. That is, the first fixed electrode 13 has a comb-shape. Alternatively, the first fixed electrode 13 can have a shape other than a comb-shape. For example, the first fixed electrode 13 can have a plate-shape.

In the embodiment, the second movable electrode 34 has the detection frame 34a and the third tooth portion 34b. That is, the second movable electrode 34 has a comb-shape. Alternatively, the second movable electrode 34 can have a shape other than a comb-shape. For example, the second movable electrode 34 can have a plate-shape.

In the embodiment, the second fixed electrode 35 has the extension 35a and the fourth tooth portion 35b. That is, the second fixed electrode 35 has a comb-shape. Alternatively, the second fixed electrode 35 can have a shape other than a comb-shape. For example, the second fixed electrode 35 can have a plate-shape.

In the embodiment, the first driver 51 includes the extension 51a, the fifth tooth portion 51b, the beam 51c, the extension 51d, and the sixth tooth portion 51e. That is, the first driver 51 has a comb-shape. Alternatively, the first driver 51 can have a shape other than a comb-shape. For example, the first driver 51 can have a plate-shape.

In the embodiment, the second driver 52 includes the extension 52a, the seventh tooth portion 52b, the beam 52c, the extension 52d, and the eighth tooth portion 52e. That is, the second driver 52 has a comb-shape. Alternatively, the second driver 52 can have a shape other than a comb-shape. For example, the second driver 52 can have a plate-shape.

In the embodiment, the first and second drivers 51, 52 cause the first and second frames 11, 31 to vibrate by electrostatic force. Alternatively, the first and second drivers 51, 52 can cause the first and second frames 11, 31 to vibrate by force other than electrostatic force. For example, the first and second drivers 51, 52 can cause the first and second frames 11, 31 to vibrate by electromagnetic force.

Such changes and modifications are to be understood as being within the scope of the present invention as defined by the appended claims.

What is claimed is:

1. A sensor for detecting acceleration and angular velocity, the sensor comprising:
   a base;
   an acceleration detector including a pair of first fixed electrodes, a pair of first movable electrodes, and a pair of first supporting members configured to support the pair of first movable electrodes;
   an angular velocity detector including a pair of second fixed electrodes, a pair of second movable electrodes, and a pair of second supporting members configured to support the pair of second movable electrodes;
   a driver configured to cause the pair of first supporting members to vibrate in opposite phases in a first direction and configured to cause the pair of second supporting members to vibrate in opposite phases in the first direction by electrostatic force;
   a first spring having elasticity in the first direction;
   a second spring configured to couple the pair of first supporting members to the base, the second spring having elasticity in both the first direction and a second direction perpendicular to the first direction;
   a third spring configured to couple the pair of first supporting members to the pair of second supporting members, the third spring having elasticity in both the first direction and the second direction;
   a fourth spring configured to couple the pair of second supporting members to the pair of second movable electrodes, the fourth spring having elasticity in the second direction; and
   a fifth spring configured to couple the pair of second supporting members together, the fifth spring having elasticity in the first direction, wherein
   the pair of first supporting members are arranged in the first direction and coupled together by the first spring,
   the pair of first movable electrodes is located to face the pair of first fixed electrodes in the second direction to form a first capacitor therebetween,
   the pair of second supporting members is located in a region surrounded by the pair of first supporting members,
   the pair of second movable electrodes is located to face the pair of second fixed electrodes in the second direction to form a second capacitor therebetween,
   the acceleration detector detects the acceleration in the second direction based on a change in a capacitance of the first capacitor due to inertial force,
   the angular velocity detector detects the angular velocity in a third direction perpendicular to each of the first and second directions based on a change in a capacitance of the second capacitor due to inertial force.

2. The sensor according to claim 1, wherein
   each of the pair of first fixed electrodes and the pair of first movable electrodes has a comb-shape.

3. The sensor according to claim 1, wherein
   each of the pair of second fixed electrodes and the pair of second movable electrodes has a comb-shape.

4. The sensor according to claim 1, wherein
   the driver includes a comb electrode.

5. The sensor according to claim 1, wherein
   the driver uses electromagnetic force to cause the pair of first supporting members to vibrate in opposite phases in the first direction and to cause the pair of second supporting members to vibrate in opposite phases in the first direction.

6. The sensor according to claim 5, wherein
   the driver includes a first driver and a second driver,
   the first driver causes the pair of first supporting members to vibrate in opposite phases in the first direction by electrostatic force, and
   the second driver causes the pair of second supporting members to vibrate in opposite phases in the first direction by electrostatic force.

7. The sensor according to claim 1, wherein
   the base is a semiconductor substrate, and
   the acceleration detector, the angular velocity detector, and the driver are integrated on the semiconductor substrate.

8. The sensor according to claim 1, wherein
   the pair of first supporting members has a rectangular C-shape.

9. The sensor according to claim 1, wherein
   the pair of second supporting members has a rectangular ring shape.

10. The sensor according to claim 1, wherein
    the pair of second supporting members is located in a region surrounded by the pair of first supporting members, and
    the pair of second movable electrodes is located in a region surrounded by the pair of second supporting members.

11. The sensor according to claim 1, wherein
    the pair of first supporting members are coupled together by the first spring in the first direction.

* * * * *